United States Patent [19]
Johnson

[11] 3,922,894
[45] Dec. 2, 1975

[54] STORABLE CABLE LOCK

[76] Inventor: Robert W. Johnson, 5409 Fremont Ave., Minneapolis, Minn. 55430

[22] Filed: July 26, 1974

[21] Appl. No.: 492,177

[52] U.S. Cl. ................................................ 70/18
[51] Int. Cl.² .......................................... E05B 73/00
[58] Field of Search ........... 70/18, 57, 58, 225, 226, 70/227, 233, 234, 238

[56] References Cited
UNITED STATES PATENTS
1,401,721  12/1921  Nicodemus ........................... 70/227
1,432,656  10/1922  Bednar ................................. 70/227

Primary Examiner—Robert L. Wolfe
Attorney, Agent, or Firm—Neil B. Schulte

[57] ABSTRACT

A storable cable for locking bicycles, motorcycles and the like formed from a series of hollow tubes and short lengths of flexible steel cable connected together in such a way that the cables can slide into the tubes and provide a compact, easily stored unit. One of the cables is provided with a rubber plug which slides along the inside of the tube so that the device may also be used as an emergency air pump.

5 Claims, 4 Drawing Figures

U.S. Patent  Dec. 2, 1975  3,922,894
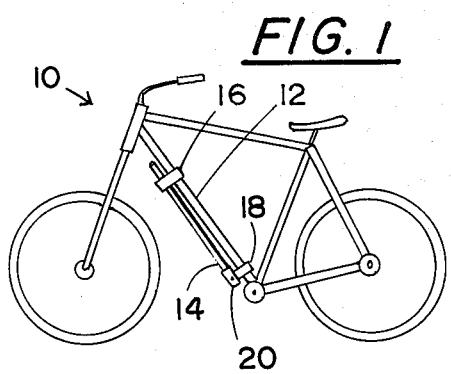
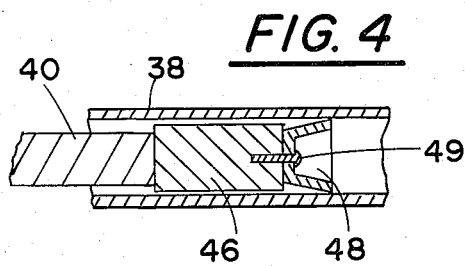
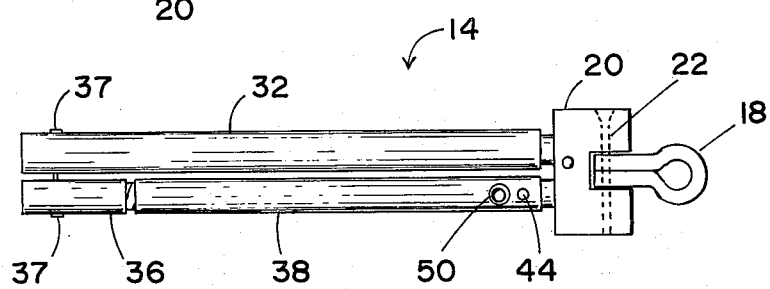
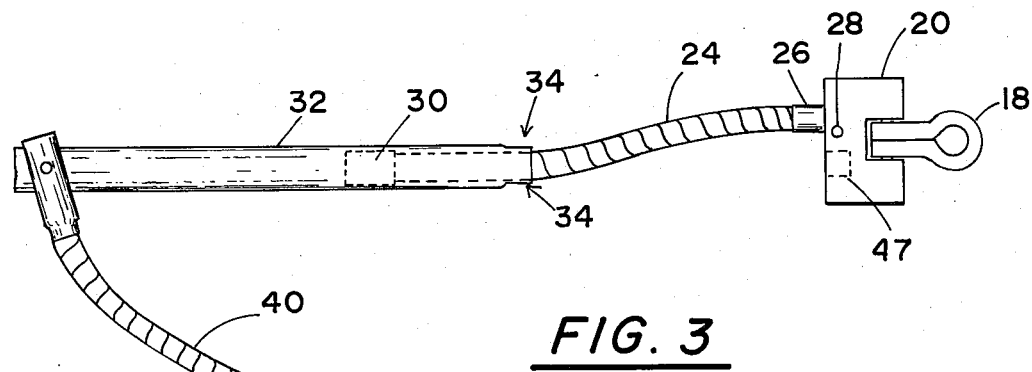
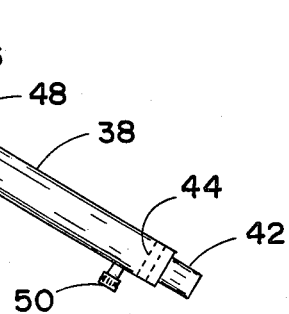

STORABLE CABLE LOCK

BACKGROUND OF THE INVENTION

In the prior art the most common way of locking up a bicycle or motorcycle or other similar light vehicle is to utilize a heavy chain which is looped through various parts of the vehicle and then locked with a padlock around a tree or other anchoring device. Such approaches work well but it is very difficult to transport the chain about on the vehicle itself expecially on lightweight bicycles which afford virtually no storage space. If the chain is carried it may become accidentally entangled in the bicycle's moving parts creating a safety hazard and possible injury. As a result the chain is sometimes left behind and is therefore not available when the bycicle is to be locked somewhere away from home. My invention overcomes this problem by providing a new type of locking device utilizing an extremely rugged chain substitute which is especially adapted to be stored and carried on a bicycle, motorcycle or the like.

SUMMARY OF THE INVENTION

Briefly, my invention comtemplates substituting a linked cable and tube assembly for the chain used in the prior art. The short lengths of steel cable can be ruggedly connected to short lengths of tube in a manner such that they can be slid in and out of the tubes. Thus the device can be folded down into a very compact package which can be stored against the frame of the bicycle until needed. To lock the device it is only necessary to pull it away from a spring clip on the frame of the bicycle and extend the cables and tubes out to their maximum length where they may be wrapped around a tree or other suitable anchoring device and locked together by a padlock. It may therefore be seen that it is an object of my invention to provide an improved locking device for any purpose but especially adapted to be used with bicycles and motorcycles. Further objects and advantages will become apparent upon consideration of the following detailed description and drawings.

BRIEF DESCRIPTION OF THE DRAWINGS

FIG. 1 is a schematic drawing of a bicycle showing how the present invention may be stored thereon in an exemplary position.

FIG. 2 shows my invention in the stored configuration with all cables and tubes contracted and pivoted together into a tight package.

FIG. 3 shows the present invention in a partially extended configuration.

FIG. 4 is a fragmentary sectional view of a portion of the apparatus of FIG. 3 showing the addition of a rubber cup to the end of one of the cables so that the storage tube may be converted into and used as an air pump.

DESCRIPTION OF THE PREFERRED EMBODIMENT

Referring to FIG. 1 a schematic showing of a bicycle 10 is presented upon which the present invention 14 is mounted. For the purposes of description herein the combination of tubes and short lengths of flexible steel cable will be referred to as a chain assembly 14. It should also be understood that the chain assembly 14 would have utility on motorcycles, and other types of small vehicles and also on airplanes and boats and any other device which is to be securely locked. For the purposes herein, however, it is described with respect to a bicycle to which the preferred embodiment shown is especially adapted.

Chain 14 is mounted to an anchoring block 20 which in turn is connected by means of a bracket 18 to the bicycle frame. At its other end chain assembly 14 is held against frame 12 of the bicycle by means of a spring metal clip 16 of a construction well known to those skilled in the art. The more detailed view of the chain assembly is shown in FIG. 2.

The invention is perhaps best understood by simultaneously referring to FIG. 2 which shows the chain assembly in a stored, compact position and FIG. 3 which shows the chain assembly in a partially extended position. As mentioned before an anchoring block 20 is connected to a frame fastening bracket 18 and is pivotable relative thereto by means of a blind rivet 22. A short piece of flexible cable 24 is terminated with a steel dowel 26 which is held in anchoring block 20 by means of another blind rivet 28. Steel dowel 26 is swaged onto the end of cable 24 in a manner well known to those skilled in the art as is another steel dowel 30 at the opposite end of flexible cable 24. Cable 24 is inserted into a tube 32 which is then crimped at the ends 34 and heat treated and hardened so that the cable can not be forcibly removed. The lesser diameter of the flexible cable 24, however, allows the cable to slide in and out of tube 32. Tube 32 has another short length of tube 36 pivoted thereto by means of a rivet 37. A second flexible cable 40 is securely fastened into tube 36 by crimping as described earlier. At the opposite end of cable 40 is another swaged dowel 46 which is held into another crimped tube 38. Tube 38 is provided with a dowel 42 at its opposite end which slides into a retaining or accepting hole 47 in anchoring block 20 when in the stored position.

To utilize the chain assembly 14, the device is simply mounted on a bicycle as shown in FIG. 1. To lock the bicycle assembly 14 is pulled away from clip 16 pivoting on blind rivet 22. The lengths of tube and flexible cable are extended to their maximum limits and the flexible chain formed thereby may be wrapped around a tree or anchoring device and brought back to the bicycle where a padlock is used to fasten the end of tube 38 to any suitable portion of the frame of the bicycle or to the chain assembly 14 itself. To facilitate this operation a hole 44 is provided in the end of tube 38 which will accept the padlock therethrough. Clearly, additional tubes and lengths of flexible cable could be added if desired to make an even longer cable or in the alternative less tubes and cables may be utilized so as to have a shorter and lighter chain assembly. Other variations include making a portion of the flexible cable storable in the actual frame tube members or handlebars of the bicycle itself. Since a number of variations of the basic theme are possible without departing from the spirit and scope of the invention I do not intend to be limited to the particular embodiment shown except as defined by the appended claims.

It has been found that the chain assembly of the present invention can also perform the function of an air pump if a dowel such as dowel 46 is provided with a small rubber cup 48 mounted on the end thereof by means of a screw 49. Rubber cup 48 forms a one way valve allowing air to be pushed into the tube 38. A one way exit valve 50 may be connected to the side of tube 38 as shown in FIG. 3. Valve 50 is exactly the same as the standard type valves used on any hand air pump associated with bicycles, motorcycles and the like. The pumping action is obtained simply by sliding the flexible cable 40 in and out of tube 38 as you would a plunger on a conventional air pump. In this way the chain assembly 14 not only allows the vehicle to be locked but also substitutes for the conventional hand pump often found in the location shown in FIG. 1.

I claim:

1. A storable cable lock comprising bracket means adatped to mount to an object to be secured with pivotable chain anchoring means pivoted on said bracket means, said anchoring means connected to a flexible chain which chain is constructed from a plurality of tubes and cables connected together in an end to end relationship in such a way that the cables can slide into said tubes so as to provide a compact storage unit.

2. The apparatus of claim 1 in which said flexible chain comprises a first length of cable connected to said anchoring means at one end and slidably connected to a first tube at the other end.

3. The apparatus of claim 2 in which said flexible chain further comprises a second length of cable pivoted on said first tube and a second tube slidable over the second cable.

4. The apparatus of claim 3 including means on the second tube to secure the second tube to said anchoring means and also including an aperture in the second tube to permit the second tube to be locked to a convenient member.

5. The apparatus of claim 3 including a flexible plug on the end of the second cable inserted into the second tube so as to provide a one way seal and further including a one way exit valve in the second tube so as to form an air pump in the second tube.

* * * * *